(12) United States Patent
Veltman

(10) Patent No.: US 8,212,494 B2
(45) Date of Patent: Jul. 3, 2012

(54) DIMMER TRIGGERING CIRCUIT, DIMMER SYSTEM AND DIMMABLE DEVICE

(75) Inventor: André Veltman, Culemborg (NL)

(73) Assignee: Lemnis Lighting Patents Holding B.V., Naarden (NL)

( * ) Notice: Subject to any disclaimer, the term of this patent is extended or adjusted under 35 U.S.C. 154(b) by 949 days.

(21) Appl. No.: 12/146,512

(22) Filed: Jun. 26, 2008

(65) Prior Publication Data

US 2009/0251059 A1    Oct. 8, 2009

Related U.S. Application Data

(60) Provisional application No. 61/042,289, filed on Apr. 4, 2008.

(51) Int. Cl.
G05F 1/00    (2006.01)
(52) U.S. Cl. ........ 315/291; 315/307; 315/308; 315/226
(58) Field of Classification Search ............. 315/200 R, 315/201, 209 R, 224, 225, 291, 297, 298, 315/299, 301, 307, 308, 362, DIG. 4
See application file for complete search history.

(56) References Cited

U.S. PATENT DOCUMENTS

| | | | |
|---|---|---|---|
| 4,935,691 A | 6/1990 | Lamar | |
| 5,194,782 A | 3/1993 | Richardson et al. | |
| 5,872,429 A | 2/1999 | Xia et al. | |
| 6,127,784 A | 10/2000 | Grossman et al. | |
| 7,102,902 B1 | 9/2006 | Brown et al. | |
| 7,170,236 B2 * | 1/2007 | Weyhrauch et al. | 315/246 |
| 2002/0017877 A1 | 2/2002 | Oostvogels et al. | |
| 2003/0080696 A1 | 5/2003 | Tang et al. | |
| 2004/0195977 A1 | 10/2004 | Fischer et al. | |
| 2004/0212321 A1 | 10/2004 | Lys et al. | |
| 2005/0057179 A1 * | 3/2005 | Madhani et al. | 315/185 R |
| 2005/0168168 A1 | 8/2005 | Elliott | |
| 2007/0182338 A1 | 8/2007 | Shteynberg et al. | |
| 2007/0182347 A1 | 8/2007 | Shteynberg et al. | |

(Continued)

FOREIGN PATENT DOCUMENTS

EP    991304 A2    4/2000

(Continued)

OTHER PUBLICATIONS

Rand D et al: "Issues, Models and Solutions for Triac Modulated Phase Dimming of LED Lamps Power electronics specialists conference 2007, IEEE, Piscataway NJ, USA, Jun. 17, 2007, pp. 1398-1404."

*Primary Examiner* — Douglas W Owens
*Assistant Examiner* — Jianzi Chen
(74) *Attorney, Agent, or Firm* — Hoyng Monegier LLP; David P. Owen; Coraline Haitjema

(57) ABSTRACT

The invention relates to a dimmer triggering circuit (12) for triggering a dimmer in an alternating current network. The dimmer has a voltage-level detector (15), and a bipolar current source circuit (18). The voltage-level detector (15) detects whether an absolute value of an input voltage of the dimmer triggering circuit is below a threshold value. The bipolar current source circuit (18) provides a current if the voltage detected by the voltage-level detector (15) is below the threshold value. If the voltage detected is not below the threshold value, the bipolar current source circuit is deactivated. The dimmer triggering circuit (12), in operation, dissipates an average power less than 100 mW.

30 Claims, 3 Drawing Sheets

U.S. PATENT DOCUMENTS

2008/0180036 A1  7/2008  Garrity et al.

FOREIGN PATENT DOCUMENTS

| | | | |
|---|---|---|---|
| EP | 1467474 | A2 | 10/2004 |
| GB | 2435724 | A | 9/2007 |
| JP | 4006694 | A | 1/1992 |
| WO | 9929142 | A1 | 6/1999 |
| WO | 2005115058 | A1 | 12/2005 |
| WO | WO2005/115058 | | 12/2005 |
| WO | 2006120629 | A2 | 11/2006 |
| WO | 2007026170 | A2 | 3/2007 |
| WO | 2008029108 | A1 | 3/2008 |

* cited by examiner

DIMMER TRIGGERING CIRCUIT, DIMMER SYSTEM AND DIMMABLE DEVICE

BACKGROUND OF THE INVENTION

1. Field of the Invention

The present invention relates to a dimmer triggering circuit for low-load applications, e.g. LED-based light sources. The invention further relates to a dimmer system comprising such a dimmer triggering circuit.

2. Description of the Related Art

Generally, phase-controlled dimmers comprise a TRIode for Alternating Current, further referred to as a TRIAC. A TRIAC is a bidirectional switch which can conduct current in either direction when it is triggered, i.e. turned on. It can be triggered by either a positive or a negative voltage being applied to its gate electrode, i.e. when a small current is applied to its gate. This current only needs to be applied for a short period of time, i.e. in the order of microseconds. In other words, the TRIAC needs to be triggered or 'fired'. Once triggered, the device continues to conduct until the current through it drops below a certain threshold value, such as at the end of a half-cycle of alternating current (AC) mains power, also referred to as a zero-crossing. As a result, the TRIAC then 'turns off'.

The aforementioned dimmers work very well for dimming incandescent bulbs. It is widely recognized that dimmers do not perform properly if they are used in low-load dimmer applications, e.g. light sources based on a light-emitting diode (LED). LEDs consume little power, and are therefore unable to operate the TRIAC-based dimmer as intended.

International application WO2005/115058 describes a dimmer system comprising a dimmer connected to a dynamic dummy load to allow a phase control dimmer to be used with LED lighting. The dynamic dummy load provides a load to the dimmer when the LEDs do not provide sufficient load. On the other hand, it provides a reduced flow of current when the LEDs provide sufficient current draw from the dimmer. However, in order to enable the dimmer system to work properly, the dynamic dimming load is required to keep the current through the TRIAC in the dimmer above its holding current. Furthermore, a dynamic load control signal is needed, which makes the dimmer system complex and difficult to implement. Finally, the dynamic dimming load described in WO2005/115058 draws a current of several mA, even when not active, resulting in considerable waste of energy.

U.S. Pat. No. 7,102,902 describes a dimmer system for dimming LEDs utilizing a dimmer comprising a TRIAC. The load applied to the dimmer is controlled such that it supplies a resistive load when needed and does not otherwise. However, the circuit described must be customized to the minimum load of the dimmer. Depending on the type of dimmer used, some components need to be adapted, which makes the dimmer system inflexible. The circuit also relies on adding a large load to the system, resulting in high current components being required in the circuit and high power loss in the system.

It is an object of the invention to provide a dimmer triggering circuit for triggering a dimmer which is unsuitable to dim LEDs otherwise, the dimmer circuit being suitable for use in combination with a wide variety of dimmers designed for incandescent bulbs, including halogen lamps, while consuming limited power. The circuit may also be used in other types of circuits where a minimum power below the specified minimum load of the dimmer is required.

SUMMARY OF THE INVENTION

The invention relates to a dimmer triggering circuit for triggering a dimmer in an alternating current network comprising:
- a voltage-level detector for detecting whether an absolute value of an input voltage of the dimmer triggering circuit is below a threshold value; and
- a current source circuit for providing a current if the voltage detected by the voltage-level detector is below the threshold value and to be deactivated otherwise;

wherein the dimmer triggering circuit, in operation, dissipates an average power less than 100 mW. In an embodiment, the dimmer triggering circuit, in operation, dissipates an average power of 10-50 mW.

In an embodiment, the bipolar current source circuit comprises a transistor controllable by the voltage level detector for conducting collector current if the voltage detected by the voltage level detector is below the threshold value. The transistor may have a base, emitter and collector, where the base is controllable by the voltage-level detector such that the first transistor may conduct the current through the emitter and the collector if the voltage detected by the voltage-level detector is below the threshold value.

In a further embodiment, the bipolar current source circuit further comprises a feedback circuit arranged for limiting the collector current conducted through the first transistor, the feedback circuit not being connected to the input voltage. The feedback circuit may comprise a further transistor, a first resistor and a second resistor, the collector of the further transistor being connected to the base of the transistor, the base of the further transistor being connected to the emitter of the transistor via the first resistor and, the second resistor enabling the emitter of the transistor to regulate towards a reference potential.

In an embodiment, the voltage-level detector comprises:
- a detection circuit; and
- a voltage dividing circuit for converting the input voltage into a voltage suitable for detection by the detection circuit.

The detection circuit may comprise an additional transistor, the base of the additional transistor being coupled to the voltage dividing circuit.

In an embodiment, the voltage-level detector comprises a microprocessor for detecting whether an absolute value of an input voltage of the dimmer triggering circuit is below a threshold value.

In an embodiment, the voltage-level detector comprises a comparator or operational amplifier for detecting whether an absolute value of an input voltage of the dimmer triggering circuit is below the threshold value.

In an embodiment, the bipolar current source circuit comprises a rectifier.

In an embodiment, the threshold value equals a value between 3 and 50 V. In another embodiment, the threshold value equals a value between 3 and 25 V.

In an embodiment, the current source circuit at deactivation provides a negligible current. The negligible current may be two orders of magnitude smaller than a maximum current the current source circuit can provide. The nominal current the current source circuit provides is in the range from 10 to 20 mA.

The invention further relates to a dimmer system comprising:
- a dimmer comprising a first terminal for connection to a terminal of an alternating current power supply and a second terminal for connection to a terminal of a dimmable electrical application to be dimmed;

a dimmer triggering circuit as mentioned above, the dimmer triggering circuit further comprising a third terminal connected to the second terminal, and a fourth terminal for connection to a further terminal of the alternating current power supply and to a further terminal of the dimmable electrical application.

The invention further relates to a dimmable device comprising:

a dimmer triggering circuit as mentioned above;

a dimmable electrical application;

wherein the dimmer triggering circuit and the dimmable electrical application are coupled in parallel and the dimmable device is connectable in series to a dimmer. The dimmable electrical application may comprise a light emitting diode.

The invention further relates to a method for triggering a dimmer in an alternating current circuit by means of a dimmer triggering circuit, the method comprising:

detecting whether an absolute value of an input voltage of the dimmer triggering circuit is below a threshold value;

providing a current by means of a bipolar current source circuit if the voltage detected is below the threshold value and not providing a current otherwise;

providing the current from the bipolar current source circuit to the dimmer.

Before the detecting, the method may further comprise generating the input voltage by rectifying an alternating voltage of the alternating current circuit. Alternatively or additionally, the method may further comprise limiting the current provided by the bipolar current source circuit. Furthermore, alternatively or additionally, before the detecting, the method may further comprise converting the input voltage into a voltage suitable for detection.

DESCRIPTION OF ILLUSTRATIVE EMBODIMENTS

The following is a description of certain embodiments of the invention, given by way of example only.

Figure 1:
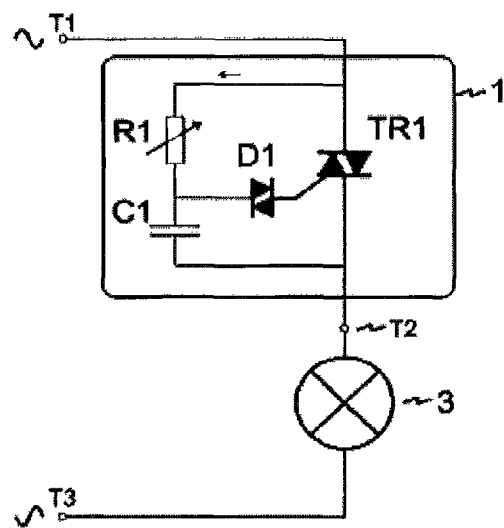
FIG. 1 schematically shows a known dimmer in connection with an incandescent bulb.

FIG. 1 schematically shows a conventional dimmer 1 in connection with an incandescent bulb 3. Note that electromagnetic interference (EMI) filter components are left out to enhance the clarity of FIG. 1. The dimmer 1 comprises a TRIAC TR1 connected in parallel with a variable resistor R1 and a capacitor C1 in series. In this description, the combination of resistor R1 and capacitor C1 will be referred to as an RC-circuit or timer circuit. Additionally, the dimmer comprises a triggering component, i.e. a component suitable to trigger the TRIAC TR1. Generally, a Diode for Alternating Current (DIAC) is used for this purpose. A DIAC is a bidirectional trigger-diode that conducts current after a DIAC threshold voltage, also referred to as the DIAC trigger voltage, has been exceeded. A DIAC remains conducting while the current flowing through it remains above a threshold current. If the current decreases below the threshold current, the DIAC switches back to a high-resistance state. The aforementioned characteristics make a DIAC very suitable as a trigger switch for a TRIAC. The dimmer 1 of FIG. 1 comprises a DIAC D1, the DIAC D1 at a first end being connected between the variable resistor R1 and the capacitor C1, and at a second end being connected to the gate of the TRIAC TR1. The dimmer 1 has two terminals, i.e. terminals T1 and T2. A series connection of the dimmer 1 and its load 3 is connected to an AC voltage source.

As mentioned earlier, the TRIAC TR1 turns off when the current through the TRIAC TR1 falls below its threshold value. Once the first zero-crossing has passed, the RC circuit will 'see' the actual AC source voltage and will charge up C1. Note that this charging current also flows through the incandescent bulb 3. Once the voltage across C1 reaches the trigger voltage of the DIAC D1, DIAC D1 starts conducting, and supplies current to the gate of TR1 while discharging capacitor C1. As a result, the TRIAC TR1 is triggered and turns on. A current starts running through the TRIAC TR1. As a result, C1 is not charged anymore.

By adjusting R1, e.g. by means of a knob or the like, the time needed to reach the DIAC trigger voltage across C1 can be set. A higher value of resistor R1 will result in a longer time needed to reach the DIAC trigger voltage on C1, and therefore in a shorter conduction interval of the TRIAC TR1. It will be understood that by adjusting the time in which current is flowing through the TRIAC TR1, the power applied to the light bulb 3, and thus its illumination intensity, can be adjusted.

Dimmers like dimmer 1 in FIG. 1 function properly if they are used to dim a light source with a sufficient load. That is, after a zero crossing the current supplied through the load needs to be sufficiently high to enable recharging of the capacitor C1 in the RC-circuit. If not, the TRIAC TR1 can no longer be triggered and dimming will not occur. Loads such as an incandescent light bulb of sufficient power provide a current path for charging the RC circuit, a prerequisite for proper functioning of dimmer 1. However, nowadays, there exist low-load applications (and/or applications with a built-in rectifier and capacitor) that do not provide a sufficient load to enable proper functioning of the dimmer 1. That is, just after the zero-crossing, there is insufficient current through this load for charging the RC-circuit.

A well-known example of a low-load application is a power-electronic circuit driving a light-source consisting of one or more light emitting diodes (LED) that require DC current. In this description, embodiments of the invention will be clarified further in combination with a LED-circuit. However, it must be understood that embodiments of the invention may also be used in combination with other low-load or discontinuous load applications, i.e. applications unable to provide the necessary charging current for the dimmer's timer circuit to enable proper functioning of a dimmer like dimmer 1 schematically shown in FIG. 1. Loads that have a rectifier front-end with a smoothing capacitor can be considered to be discontinuous load applications.

Figure 2:
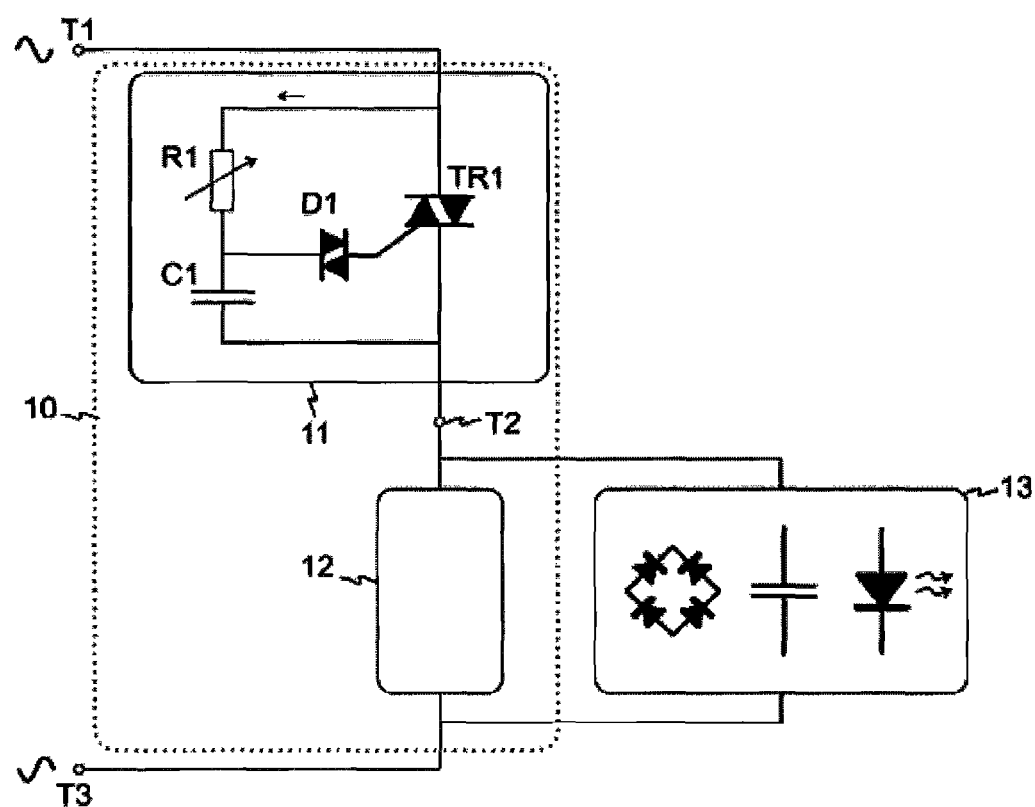
FIG. 2 schematically shows a dimmer system according to an embodiment of the invention connected to a LED.

FIG. 2 schematically shows a dimmer system 10 according to an embodiment of the invention connected to a LED-circuit 13. The dimmer system comprises a dimmer 11, and a dimmer triggering circuit (DTC) 12.

The dimmer 11 comprises a first terminal for connection to a terminal T1 of an alternating current supply and a second terminal for connection to a terminal of a dimmable electrical application, e.g. terminal T2 of LED-circuit 13. The DTC 12 comprises a third terminal, in FIG. 2 connected to the second terminal of the dimmer 11 and a fourth terminal for connection to a further terminal of the alternating circuit supply, i.e. terminal T3. Additionally, in FIG. 2, the fourth terminal is connected to a further terminal of the dimmable electrical application, i.e. LED-circuit 13. Hence, the DTC 12 is connected in series to the second terminal of the dimmer 11 and in parallel with the LED-circuit 13.

The combination of the DTC 12 and a dimmable electrical application like LED-circuit 13 may be referred to as a dimmable device.

Figure 3:
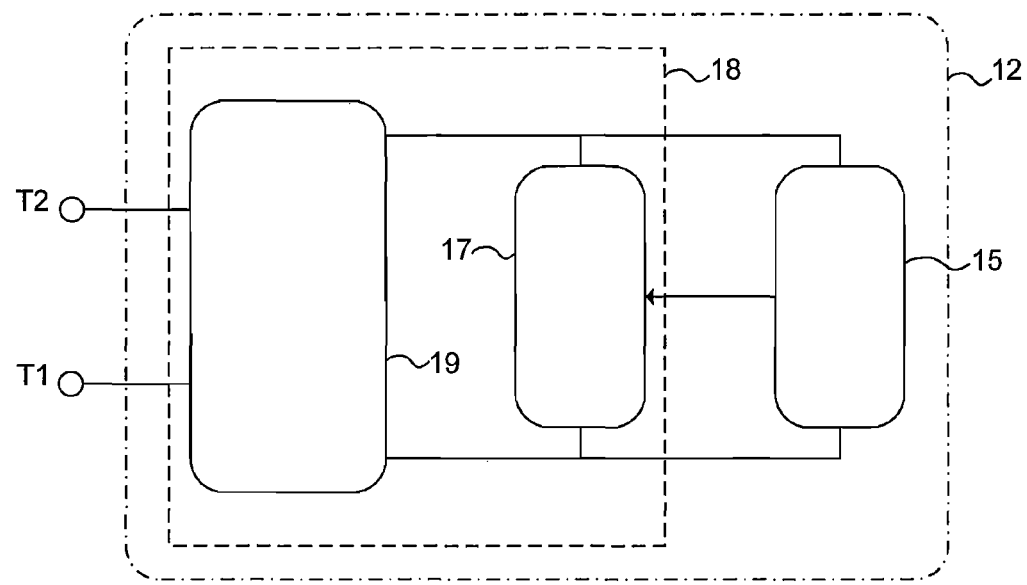
FIG. 3 schematically shows a dimmer triggering circuit according to an embodiment of the invention in more detail.

FIG. 3 schematically shows the DTC 12 in more detail. The DTC 12 comprises a voltage-level detector 15 and a bipolar current source circuit 18. The voltage-level detector 15 is arranged to detect whether the absolute value of the voltage at terminal T2 is below a threshold value. The bipolar current source circuit 18 is arranged to be activated if the voltage detected by the voltage level detector 15 remains below the threshold value and to be deactivated otherwise. Therefore, the bipolar current source circuit 18 in the DTC 12 is a voltage-dependent current source, and the DTC 12 as a whole can be considered to act as a bipolar voltage-dependent current source. As will be explained in more detail below, such a DTC 12 dissipates an average power less than 100 mW. In well-dimensioned embodiments, the DTC 12 may dissipate an average power of 10-50 mW. Preferably, the dissipation of the DTC 12 is about 30 mW. With such a dissipation most conventional dimmers are able to operate as intended.

In embodiments of the invention, the voltage-level detector 15 may comprise a microprocessor. The microprocessor is then arranged for detecting whether an absolute value of an input voltage of the dimmer triggering circuit 12 is below a threshold value. If the input voltage of the dimmer triggering circuit 12 is below the threshold value, the microprocessor may instruct the bipolar current source circuit 18 to provide a current. In embodiments of the invention, as will be explained in more detail with reference to FIG. 5B, the microprocessor may instruct the bipolar current source circuit 18 to provide the current after passage of the zero crossing.

Figure 4:
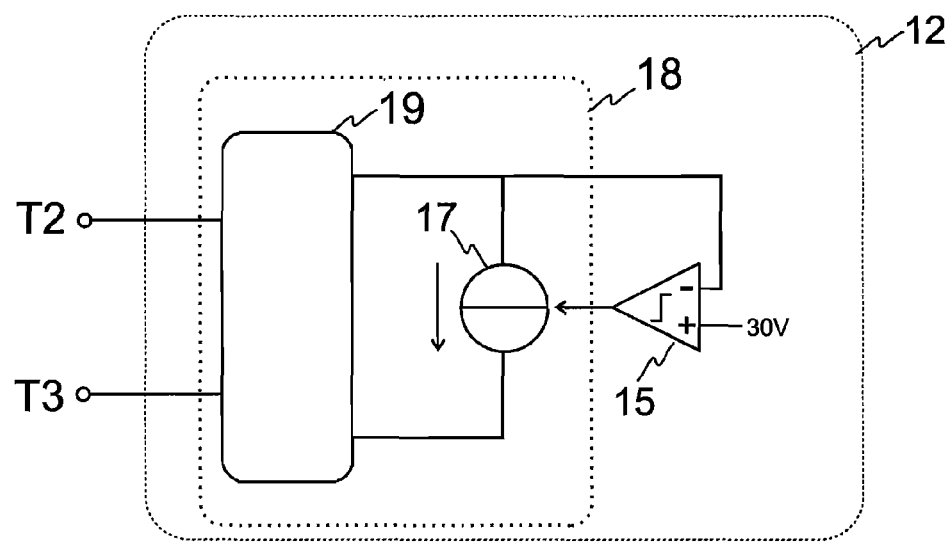
FIG. 4 shows an embodiment of a dimmer triggering circuit as shown in FIGS. 2 and 3.

In embodiments of the invention the voltage-level detector 15 comprises a comparator for detecting whether an absolute value of an input voltage of the dimmer triggering circuit is below the threshold value. The comparator comprises two inputs and a single output as schematically shown in FIG. 4. A first input is connected to a reference potential, i.e. a potential equal to the threshold value, in this example 30V. A second input is arranged to receive the input voltage of the dimmer triggering circuit 12. If the input voltage of the dimmer triggering circuit 12 at the second input of the comparator is below the threshold value at the first input of the comparator, the output of the comparator may be such that the bipolar current source circuit 18 provides a current as discussed above. Instead of a comparator, an operational amplifier can be used as will be understood by a person skilled in the art.

In the embodiment, schematically shown in FIG. 3, the bipolar current source circuit 18 comprises a current source circuit 17 and a rectifier 19. In this embodiment, the current source circuit 17 is coupled to the voltage-level detector 15. Furthermore, both the voltage-level detector 15 and the current source circuit 17 are connected to the DC terminals of rectifier 19.

The rectifier 19 in the DTC 12 of FIG. 3 has an AC-side, i.e. terminals connected to terminals T2 and T3 respectively, and a DC-side, i.e. terminals connected to a reference potential and the other components in the DTC 12 like the voltage-level detector 15 and the current source circuit 17 in the bipolar current source circuit 18. The voltage-level detector 15 and current source circuit 17 form a unipolar circuit. The rectifier 19 is arranged to enable the current generated by the current source circuit 17 to be supplied as a bipolar current to the dimmer 11.

The DTC 12 forces the dimmer 11 to work as if it was loaded by a normal incandescent lamp. If the AC-voltage is sufficiently low, i.e. below the aforementioned threshold value, the DTC 12 is activated and enables sufficient current to flow into the RC-circuit of the dimmer 11. Note that as the voltage-level detector 15 in the embodiment of FIG. 3 is located at the DC-side of the rectifier 19, only an absolute threshold value is needed. This means that if the threshold value is 30V, the DTC 12 is activated in the range −30V to +30V.

In some embodiments of the DTC 12, when used in connection with a mains power system of 230 V and 50 Hz, the threshold value lies between 3 V and 50 V. In other embodiments of the DTC 12 the minimal threshold value is 10V. In case the DTC 12 is connected to a mains power system of 120 V and 60 Hz, as used in the United States, the threshold value may lie between 3V and 25 V.

In some embodiments of the DTC 12 the average rectified voltage measured with the voltage-level detector 15 may be used as a set point for current through the low-load application, e.g. a LED-circuit 13 as schematically depicted in FIG. 3. This enables further optimization of dimming of the low-load application. In case of LED-illumination such optimization may result in setting an intensity range of dimming different from 0-100% of the LEDs maximum light intensity, e.g. 30-80%. Additionally, optimization may take the form of more sensitive dimming in low light-intensity regions, i.e. 1-10% within the set light intensity range, and less sensitive dimming in high light intensity regions, e.g. 10-100% within the set light intensity range.

The current provided by the DTC 12 keeps the load voltage effectively zero until the TRIAC in the dimmer 11 is triggered, e.g. as schematically shown in FIG. 1 with respect to TRIAC TR1 being triggered by DIAC D1. As soon as the TRIAC switches on, the voltage at terminal T2 increases by a large amount. As a result, the current source circuit 17 in the DTC 12 is deactivated.

Hence, ideally the DTC 12 only conducts current when the voltage at T2 exceeds a threshold value and behaves like an open circuit otherwise. However, in reality the DTC 12 will provide current while being deactivated. Preferably, the current provided by the current source circuit 17 in the DTC 12 at deactivation is negligible. A current may be considered to be negligible if the current is at least two orders of magnitude smaller than the maximum current the current source circuit 17 of the DTC 12 can provide. So, for example, if the maximum current to be provided by the current source circuit 17 in the DTC 12 is 15 mA, a current is considered to be negligible if its value remains below 100 µA.

After a zero crossing has passed, in case solely a discontinuous load is present, i.e. a load that draws a discontinuous current such that for a certain part of the cycle time the current is zero, e.g. a bridge rectifier with a capacitor at the output, the DTC 12 acts complementarily to the state of the TRIAC in the dimmer 11. That is, if the DTC 12 is on, the TRIAC in the dimmer 11 is off, and vice versa.

On the other hand, if besides a discontinuous load also another load is present, after a zero crossing has passed, both the DTC 12 and the TRIAC in the dimmer 11 may be on at the same time. That is until the DTC 12 shuts off when the input voltage of the DTC 12 exceeds the threshold value described earlier. In such a case, the DTC 12 and the TRIAC in the dimmer 11 do not act complementarily. For a fraction of a millisecond, power is dissipated. This dissipated power will be negligible though. For example, for a threshold value of 20V and a current source circuit 17 arranged to provide a current of 15 mA the peak power will not exceed 0.3 W and the average power will not exceed 30 mW.

In general, by passing the zero crossing, the TRIAC turns off (in case it was still on), while the DTC 12 remains on. When the TRIAC turns on, the DTC 12 turns off.

Hence, the DTC 12 is arranged to supply a current when the absolute voltage at T2 is below a threshold value. This current only needs to be sufficient to enable recharging of the capacitor in the RC-circuit of the dimmer and has no relation to the TRIAC's holding current or minimum load of the dimmer in question. This provides the benefit that the DTC 12 can also be used in combination with a TRIAC having a holding current larger than the maximum current to be provided by the DTC 12. Hence, even if the DTC 12 is capable of providing a maximum current of, for example, 15 mA, a dimmer 11 comprising a TRIAC with a holding current larger than 15 mA, e.g. 100 mA, can be used to enable dimming of low load applications.

In order to enable proper functioning of the DTC 12 in a dimmer system 10, e.g. when coupled to a LED-circuit 13 as schematically shown in FIG. 2, the capacitance at the AC-side of the rectifier 19 is preferably minimized, as will be understood by a person skilled in the art. Preferably, no additional capacitance is present between T2 and T3. The LED-circuit 13 generally comprises, besides one or more LEDs, a rectifier and one or more smoothing capacitors.

Thus, the DTC 12 may be used to provide a method for triggering a dimmer in an alternating current circuit. Such a method would comprise detecting whether an absolute value of an input voltage of the DTC is below a threshold value. Subsequently, a current is provided by means of a current source circuit if the voltage detected is below the threshold value. If the voltage detected is not below the threshold value, no current is provided. The current provided from the current source circuit is then provided to the dimmer.

Before the aforementioned detecting, the aforementioned input voltage may be generated by rectifying an alternating voltage of the alternating current circuit. Subsequently or alternatively, the input voltage may be converted into a voltage suitable for detection. Finally, the current provided by the current source circuit may be limited.

Figure 5:
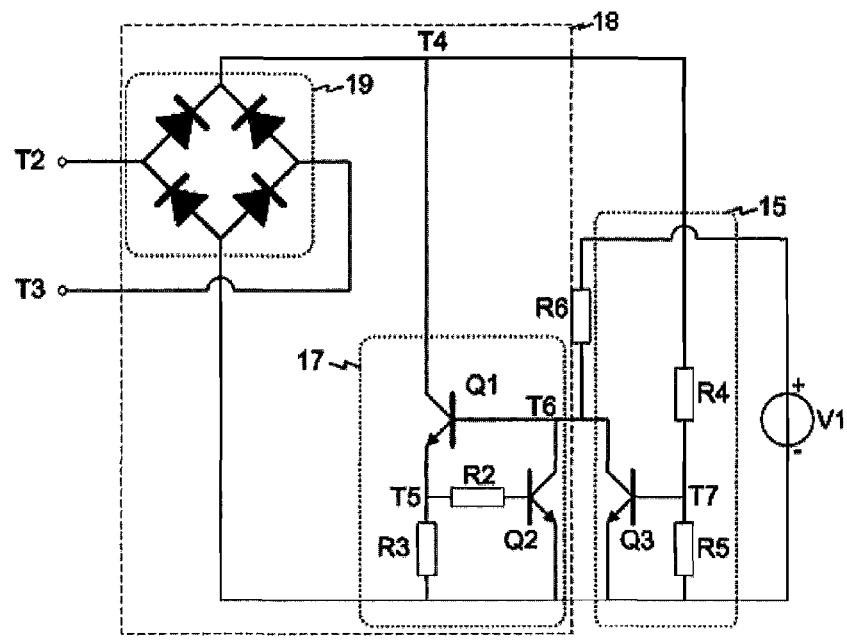
FIG. 5 shows another embodiment of a dimmer triggering circuit as shown in FIGS. 2 and 3 in detail.

FIG. 5 shows another embodiment of a DTC like DTC 12 shown in FIGS. 2 and 3 in detail. It must be understood that this embodiment merely serves as an example of a possible implementation of the invention. As a skilled person will know, many implementations are possible. For example, instead of bipolar NPN-transistors other switches like bipolar PNP-transistors, Integrated-Gate Bipolar Transistors (IGBTs) or Metal-Oxide-Semiconductor Field-Effect Transistors (MOSFETs) may be used.

In this particular embodiment, the bipolar current source circuit 18 again comprises a current source circuit 17 and a rectifier 19. The rectifier 19 comprises a rectifying diode bridge. The current source circuit 17 comprises two resistors R2, R3 and two NPN-transistors Q1, Q2. The voltage-level detector 15 comprises an NPN-transistor Q3 and two resistors R4 and R5.

In this particular embodiment, a DC voltage source V1 is connected to the collector of transistor Q3 of the voltage-level detector 15. Resistor R6 is chosen such that a desirable base current may be applied to Q1 when Q3 is off. The DC voltage source V1 may be an external source. It must be understood that, in order to obtain the aforementioned desirable base current, instead of a DC voltage source V1 and a resistor R6, also a current source may be used. Resistors R4 and R5 form a voltage-divider designed such that if the voltage at T4 is below aforementioned threshold value, the voltage at T7 is such that Q3 is off.

The collector of Q1 in this particular embodiment of the current source circuit 17 is connected to the terminal of the rectifying diode bridge denoted as T4. The base of Q1 is connected to the collector of Q2, and also to the collector of Q3 in the voltage-level detector 15. When the voltage at T4 is below aforementioned threshold value, Q3 is off, and R6 will now provide current to the base of Q1. As a result, the voltage at T6 increases such that Q1 turns on. As a result, Q1 conducts current and voltage at T4 decreases even more, depending on the impedance of the source, which results in an even lower voltage at T7. Consequently, the switch-off time of Q3 is limited. If the current through Q1 exceeds a certain value, the base voltage of Q2 exceeds its switch on voltage, and Q2 starts to conduct, therewith stabilizing the potential at T6, and therefore lowering the current passing through Q1. Resistors R2 and R3 are used to design a current source with suitable characteristics, i.e. that transistor Q2 starts conducting if the emitter current through transistor Q1 exceeds a certain value, e.g. a nominal current in the range from 10 to 20 mA. Hence, the combination of transistor Q2 and resistors R2 and R3 provide a feedback circuit which effectively limits the collector current of transistor Q1. The combination of transistors Q1, Q2 and resistors R2, R3 form a stable current source circuit 17 for voltages T4 higher than approximately 1V with respect to the negative terminal of the rectifier 19. When the voltage on T4 goes below approximately 1V the collector current will reduce.

The current source circuit 17 is activated when the voltage-level detector 15 detects that the voltage at T4 becomes lower than a predetermined threshold value and deactivated when the voltage at T4 rises again above a predetermined threshold value.

In order to obtain a DTC 12 designed to supply a current of 15 mA when the voltage at T2 is between −30V and 30V, typical values of the components shown in FIG. 4 are: R2=4.7 kΩ; R3=33Ω; R4=6.6 MΩ (generally constructed by placing two resistors with a value of 3.3 MΩ in series); R5=100 kΩ; R6=47 kΩ; Q1=FMMT458; Q2=BC817; Q3=BC817; V1=10V. The current being provided by the DTC 12 shown in FIG. 4 and provided with components with aforementioned values during activation will be approximately 15 mA, while during deactivation ideally the current will be approximately only 49 PA. Adding leakage current through transistor Q1 may add a few μA.

Figure 6A:
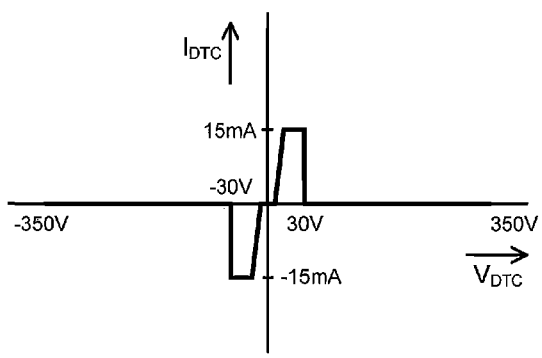
FIG. 6A schematically shows a graph of the voltage-current behavior between terminals of the dimmer triggering circuit of FIG. 4.

FIG. 6A schematically shows a graph of the calculation of behavior of current $I_{DTC}$, i.e. the current through a DTC, as a function of voltage $V_{DTC}$, i.e. the voltage across the DTC. In this calculation, the DTC of FIG. 4 is used in which the aforementioned typical values are used for the respective components. Consequently, the DTC is arranged to supply a maximum current with an absolute value of 15 mA if the voltage across the DTC becomes lower than a threshold value of 30V. Due to the rectifier, the current may be supplied to the dimmer in opposite directions.

It may be noted that $I_{DTC}$ equals zero when $V_{DTC}$ is close to zero, and at a certain value of $V_{DTC}$ rises quickly to the design current, in this case an $I_{DTC}$ of no more than 15 mA. for the low current near zero $V_{DTC}$ is due to the fact that at low voltage, the current source circuit 17 only supplies current on demand, i.e. the dimmer 11 only needs limited current to charge up its timer circuit. The shape of the curve shown in FIG. 5, which relates to the current source circuit 17 schematically depicted in FIG. 4, is the result of transistor Q1 being in saturation at low voltages.

Figure 6B:
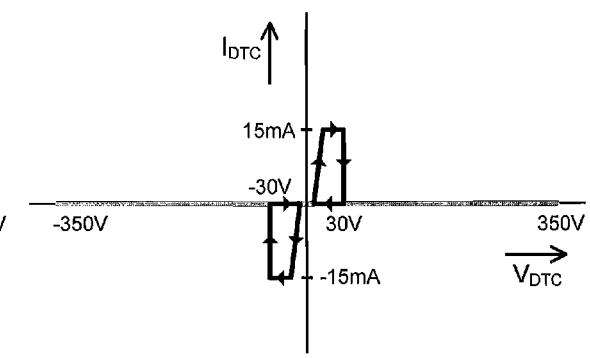
FIG. 6B schematically shows a graph of the voltage-current behavior between terminals of an embodiment of a dimmer triggering circuit of FIG. 3 comprising a microprocessor.

FIG. 6B schematically shows a graph of the voltage-current behavior between terminals of an embodiment of a dimmer triggering circuit of FIG. 3 comprising a microprocessor. As shown in FIG. 5A, just before passage of a zero crossing, the DTC 12 may be switched on while the TRIAC in the dimmer 11 may also be on at the same time. As a result, for a short period of time, i.e. the time needed for the voltage across the DTC 12 to go from the threshold value towards zero, power is dissipated. In an embodiment comprising a microprocessor as voltage-level detector 15, the microprocessor may be programmed in such a way that it will only allow the bipolar current source circuit 18 to be active after passage of the zero crossing. As a result, the voltage-current behavior between terminals of the DTC 12 becomes as schematically shown in FIG. 6B.

In FIG. 6B, it can be readily seen that the $I_{DTC}$ experiences a kind of hysteresis. That is, the value of $I_{DTC}$ at a certain $V_{DTC}$ depends on former values of $V_{DTC}$. The parts in the graph for which $I_{DTC}$ is independent of past values of $V_{DTC}$ has been schematically illustrated by the gray line. The parts in the graph for which $I_{DTC}$ depends on past values of $V_{DTC}$ has been schematically illustrated by the black line. The arrows denote the direction of change of $V_{DTC}$.

The terms "base", "collector" and "emitter" used herein should be broadly interpreted as not only referring to connections to a bipolar transistor. They may also refer to similar connections, i.e. "gate", "drain" and "source" respectively, in case other types of transistors like MOSFETs are used.

Thus, the invention has been described by reference to certain embodiments discussed above. It will be recognized that these embodiments are susceptible to various modifications and alternative forms well known to those of skill in the art.

For example, instead of using a DTC with a full wave rectifier like a diode rectifier bridge, two DTCs with a half wave rectifier may be used. In the latter case, one DTC will be used for one direction of the AC-current, and the other DTC will be used in the opposite direction.

Furthermore, embodiments of the invention have been described with respect to a DTC. However, the invention may also relate to a circuit for providing a predetermined current to an alternating current circuit when an input voltage is below a predetermined value, which operates in a similar way as the DTC described above.

Similarly, the invention may also relate to a method for providing a predetermined current to an alternating current circuit when an input voltage is below a predetermined value. The method then comprises detecting whether an absolute value of an input voltage of the alternating current circuit is below a threshold value, providing a current by means of a current source circuit if the voltage detected is below the threshold value and not providing a current otherwise and providing the current from the current source circuit to the alternating current circuit.

What is claimed is:

1. A dimmer triggering circuit for triggering a dimmer comprising a triac in an alternating current network comprising:

a voltage-level detector for detecting whether an absolute value of an input voltage of the dimmer triggering circuit is below a threshold value; and a bipolar current source circuit for providing a current if the voltage detected by the voltage-level detector is below said threshold value and to be deactivated otherwise; wherein the dimmer triggering circuit, in operation, dissipates an average power less than 100 mW and wherein the current provided by the dimmer triggering circuit keeps a load voltage effectively zero until the triac is triggered.

2. The dimmer triggering circuit according to claim 1, wherein the dimmer triggering circuit, in operation, dissipates an average power of 10-50 mW.

3. The dimmer triggering circuit according to claim 1, wherein the bipolar current source circuit comprises a transistor controllable by the voltage-level detector for conducting current if the input voltage detected by the voltage level detector is below the threshold value.

4. The dimmer triggering circuit according to claim 3, wherein the transistor has a base, emitter and collector, the base being controllable by the voltage-level detector such that the transistor conducts the current through the emitter and the collector if the voltage detected by the voltage-level detector is below the threshold value.

5. The dimmer triggering circuit according to claim 3, wherein the bipolar current source circuit further comprises a feedback circuit arranged for limiting the current conducted through the transistor.

6. The dimmer triggering circuit according to claim 5, wherein the feedback circuit comprises a further transistor, a first resistor and a second resistor, the collector of the further transistor being connected to the base of the transistor, the base of the further transistor being connected to the emitter of the transistor via the first resistor and, the second resistor enabling the emitter of the transistor to regulate towards a reference potential.

7. The dimmer triggering circuit according to claim 1, wherein the voltage-level detector comprises:

a detection circuit; and a voltage dividing circuit for converting the input voltage into a voltage suitable for detection by the detection circuit.

8. The dimmer triggering circuit according to claim 7, wherein the detection circuit comprises an additional transistor, the base of the additional transistor being coupled to the voltage dividing circuit.

9. The dimmer triggering circuit according to claim 1, wherein the voltage-level detector comprises a microprocessor for detecting whether an absolute value of an input voltage of the dimmer triggering circuit is below the threshold value.

10. The dimmer triggering circuit according to claim 1, wherein the voltage-level detector comprises a comparator or operational amplifier for detecting whether the absolute value of the input voltage of the dimmer triggering circuit is below the threshold value.

11. The dimmer triggering circuit according to claim 1, wherein the bipolar current source circuit comprises a rectifier.

12. The dimmer triggering circuit according to claim 11, wherein the rectifier rectifies an alternating voltage of the alternating current circuit to generate the input voltage.

13. The dimmer triggering circuit according to claim 1, wherein the threshold value is a value between 3 and 50 V.

14. The dimmer triggering circuit according to claim 1, wherein the threshold value is a value between 3 and 25 V.

15. The dimmer triggering circuit according to claim 1, wherein the bipolar current source circuit at deactivation provides a negligible current.

16. The dimmer triggering circuit according to claim 15, wherein the negligible current is two orders of magnitude smaller than a maximum current the bipolar current source circuit can provide.

17. The dimmer triggering circuit according to claim 16, wherein the nominal current of the bipolar current source circuit is in the range from 10 to 20 mA.

18. A dimmer system comprising:
a dimmer comprising a triac, the dimmer comprising a first terminal for connection to a terminal of an alternating current power supply and a second terminal for connection to a terminal of a dimmable electrical application to be dimmed;
a dimmer triggering circuit according to claim 1, the dimmer triggering circuit further comprising a third terminal connected to the second terminal, and a fourth terminal for connection to a further terminal of the alternating current power supply and to a further terminal of said dimmable electrical application.

19. The dimmer system according to claim 18, wherein the triac has a predetermined holding current, and wherein the bipolar current source circuit, when activated, provides a current lower than the holding current of the triac.

20. A dimmable device comprising:
a dimmer triggering circuit according to claim 1; and
a dimmable electrical application;
wherein the dimmer triggering circuit and the dimmable electrical application are coupled in parallel and wherein the dimmable device is connectable in series to the dimmer comprising a triac.

21. The dimmable device according to claim 20, wherein the dimmable electrical application comprises a light emitting diode.

22. The dimmer triggering circuit according to claim 1, wherein the dimmer triggering circuit includes no capacitive elements between its input terminals.

23. The dimmer triggering circuit according to claim 1, wherein the dimmer triggering circuit behaves like an open circuit when the bipolar current source is deactivated.

24. The dimmer triggering circuit according to claim 1, wherein the current source provides less than 100 microamps when deactivated.

25. A method for triggering a dimmer comprising a triac in an alternating current circuit by means of a dimmer triggering circuit, the method comprising:
detecting whether an absolute value of an input voltage of the dimmer triggering circuit is below a threshold value;
providing a current by means of a bipolar current source circuit if the voltage detected is below the threshold value and not providing a current otherwise;
providing the current from the bipolar current source circuit to the dimmer;
wherein the current provided by the bipolar current source keeps a load voltage effectively zero until the triac is triggered.

26. The method according to claim 25, wherein the method, before the detecting, further comprises generating the input voltage by rectifying an alternating voltage of the alternating current circuit.

27. The method according to claim 25, wherein the method further comprises limiting the current provided by the bipolar current source circuit.

28. The method according to claim 25, wherein the method, before the detecting, further comprises converting the input voltage into a voltage suitable for detection.

29. A dimmer triggering circuit for triggering a dimmer in an alternating current network comprising:
a voltage-level detector for detecting whether an absolute value of an input voltage of the dimmer triggering circuit is below a threshold value; and
a bipolar current source circuit for providing a current if the voltage detected by the voltage-level detector is below said threshold value and to be deactivated otherwise;
wherein, when operated in combination with a dimmer comprising a triac, the dimmer triggering circuit acts complementarily to the state of the triac in the dimmer so that the bipolar current source provides current when the triac is switched off and is deactivated when the triac is switched on.

30. The dimmer triggering circuit of claim 29, wherein the triac has a predetermined holding current, and wherein the bipolar current source circuit, when activated, provides a current lower than the holding current of the triac.

* * * * *